(12) United States Patent
Wagner

(10) Patent No.: US 12,110,239 B2
(45) Date of Patent: Oct. 8, 2024

(54) WATER MANAGEMENT SYSTEM

(71) Applicant: Robin J. Wagner, Scottsdale, AZ (US)

(72) Inventor: Robin J. Wagner, Scottsdale, AZ (US)

( * ) Notice: Subject to any disclaimer, the term of this patent is extended or adjusted under 35 U.S.C. 154(b) by 253 days.

(21) Appl. No.: 17/352,037

(22) Filed: Jun. 18, 2021

(65) Prior Publication Data

US 2022/0402782 A1    Dec. 22, 2022

(51) Int. Cl.
| | |
|---|---|
| *C02F 1/46* | (2023.01) |
| *C02F 1/467* | (2023.01) |
| *C02F 1/66* | (2023.01) |
| C02F 103/42 | (2006.01) |

(52) U.S. Cl.
CPC ............. *C02F 1/4672* (2013.01); *C02F 1/66* (2013.01); *C02F 2103/42* (2013.01); *C02F 2209/06* (2013.01); *C02F 2305/14* (2013.01)

(58) Field of Classification Search
None
See application file for complete search history.

(56) References Cited

U.S. PATENT DOCUMENTS

| | | |
|---|---|---|
| 3,546,089 A | 12/1970 | Schneider |
| 3,563,879 A | 2/1971 | Richards |
| 3,669,857 A | 6/1972 | Kirkham et al. |
| 4,033,871 A | 7/1977 | Wall |
| 4,136,005 A | 1/1979 | Persson |
| 4,229,272 A | 10/1980 | Yates |
| 4,263,114 A | 4/1981 | Shindell |
| 4,308,117 A | 12/1981 | Sweeney |
| 4,363,713 A | 12/1982 | Bindon |
| 4,381,240 A | 4/1983 | Russell |
| 5,037,519 A | 8/1991 | Wiscombe |
| 5,133,848 A | 7/1992 | Meyers |
| 5,160,596 A | 11/1992 | Keller, Jr. |
| 5,326,443 A | 7/1994 | Hilbig |
| 5,366,605 A | 11/1994 | Wang |
| 7,238,278 B2 | 7/2007 | Coffey et al. |
| 9,175,489 B1 | 11/2015 | Wagner |
| 11,331,616 B2 | 5/2022 | Henderson et al. |
| 2006/0113256 A1 | 6/2006 | Birkbeck |
| 2008/0203009 A1 | 8/2008 | Hazlehurst |

(Continued)

FOREIGN PATENT DOCUMENTS

| | | |
|---|---|---|
| GB | 2436330 A | 9/2007 |
| WO | WO-2018234241 A | 12/2018 |

OTHER PUBLICATIONS

Pool pH: High and Low Fixes; 2 pages; published Oct. 2, 2020. (Year: 2020).

(Continued)

*Primary Examiner* — Peter Keyworth
(74) *Attorney, Agent, or Firm* — Schmeiser, Olsen & Watts LLP

(57) ABSTRACT

A water treatment system is provided. The system includes a container holding a reactant liquid within the container. The system further includes an electrode capsule removably retained within the container and submerged in the reactant liquid. The electrode capsule operates to generate reactant gas by operating within the reactant liquid. The system includes a cap releasably coupled to an opening of the container. The cap includes a nozzle that allows flow of reactant gas out of the container to treat an amount of water.

8 Claims, 6 Drawing Sheets

(56) References Cited

U.S. PATENT DOCUMENTS

| | | |
|---|---|---|
| 2014/0287065 A1 | 9/2014 | Watson |
| 2017/0144911 A1 | 5/2017 | Lakshmanan et al. |
| 2021/0094850 A1* | 4/2021 | Shanahan ........... C02F 1/46109 |

OTHER PUBLICATIONS

Best Water For Cannabis Plants: Ideal PPM, pH & Temperature; 25 pages; Jan. 19, 2021. (Year: 2021).

WayBackMachine for "Pool pH: High and Low Fixes"; 1 page; shows published Oct. 2, 2020. (Year: 2020).

WayBackMachine for Best Water For Cannabis Plants: Ideal PPM, pH & Temperature; 1 page; Jan. 19, 2021. (Year: 2021).

* cited by examiner

WATER MANAGEMENT SYSTEM

BACKGROUND OF THE INVENTION

Technical Field

This invention relates generally to a system for treating a water and more particularly to a system for controlling pH, alkalinity and/or sanitation of water.

State of the Art

There are many different ways to treat water for controlling the pH level, alkalinity and/or sanitation of the water and most involve the use of additives, such as chemicals. For example, and without limitation, additives such as lime, wood ash, sulfur, phosphoric acid or specially formulated solutions can be used to raise or lower the pH of water. Other additives may be used for purposes of controlling the alkalinity and/or sanitation of water. Filters may also be employed with or without the added chemicals in efforts to the control the pH, alkalinity and/or sanitation of the water.

There is a need for an improved device that can control the pH level, alkalinity and/or sanitation of water without the need of chemicals or other additives.

SUMMARY OF THE INVENTION

An embodiment includes a water treatment system, comprising: a container having an opening, the container comprising a reactant liquid within the container; an electrode capsule removably retained within the container and submerged in the reactant liquid, the electrode capsule comprising: a housing having a housing body, an inner volume within the housing bodying and a plurality of holes in the housing body that extend from an outer surface of the housing body to within the inner volume; a first electrode and a second electrode having a space between them, wherein a first flat face of the first electrode is facing and spaced apart from a second flat face of a second electrode, wherein the first electrode and the second electrode are retained within the housing, wherein the plurality of holes in the housing allow reactant liquid to fill voids within the housing and the electrodes operate within the reactant liquid to form a reactant gas escapes the housing through the plurality of holes and into the container; and a cap releasably coupled to the opening of the container, the cap comprising a nozzle, wherein the cap and the housing are configured to allow an electrical connection to be coupled to the first and second electrodes of the electrode capsule and the nozzle allows flow of reactant gas out of the container to treat an amount of water.

Another embodiment includes a method of operating a water treatment system, comprising: coupling a water treatment system to a pump, the water treatment system comprising: a container having an opening, the container comprising a reactant liquid within the container; an electrode capsule removably retained within the container and submerged in the reactant liquid, the electrode capsule comprising: a housing having a housing body, an inner volume within the housing bodying and a plurality of holes in the housing body that extend from an outer surface of the housing body to within the inner volume; a first electrode and a second electrode having a space between them, wherein a first flat face of the first electrode is facing and spaced apart from a second flat face of a second electrode, wherein the first electrode and the second electrode are retained within the housing, wherein the plurality of holes in the housing allow reactant liquid to fill voids within the housing and the electrodes operate within the reactant liquid to form a reactant gas escapes the housing through the plurality of holes and into the container; and a cap releasably coupled to the opening of the container, the cap comprising a nozzle, wherein the cap and the housing are configured to allow an electrical connection to be coupled to the first and second electrodes of the electrode capsule and the nozzle allows flow off reactant gas out of the container; operating the water treatment system to generate the reactant gas; flow the reactant gas to the pump; flow a portion of water from an amount of water being treated to the pump; gasify and strain the portion of water entering the pump in response to combining the reactant gas with the portion of water; and flow the gasified and strained portion of water to the amount of water being treated.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE INVENTION

Figure 1:
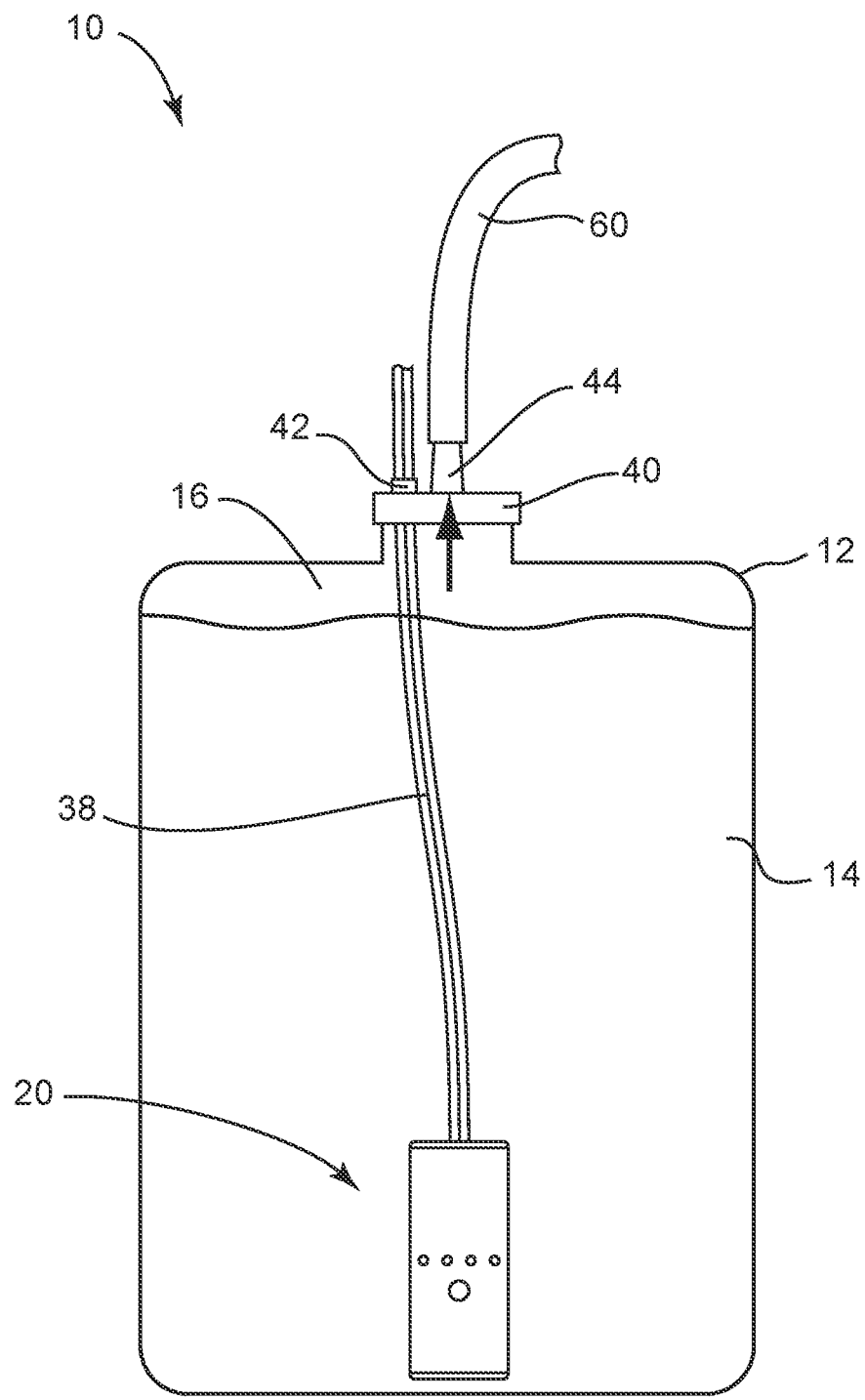
FIG. 1 is a side view of a water management system in operational use according to an embodiment.
Figure 2A:
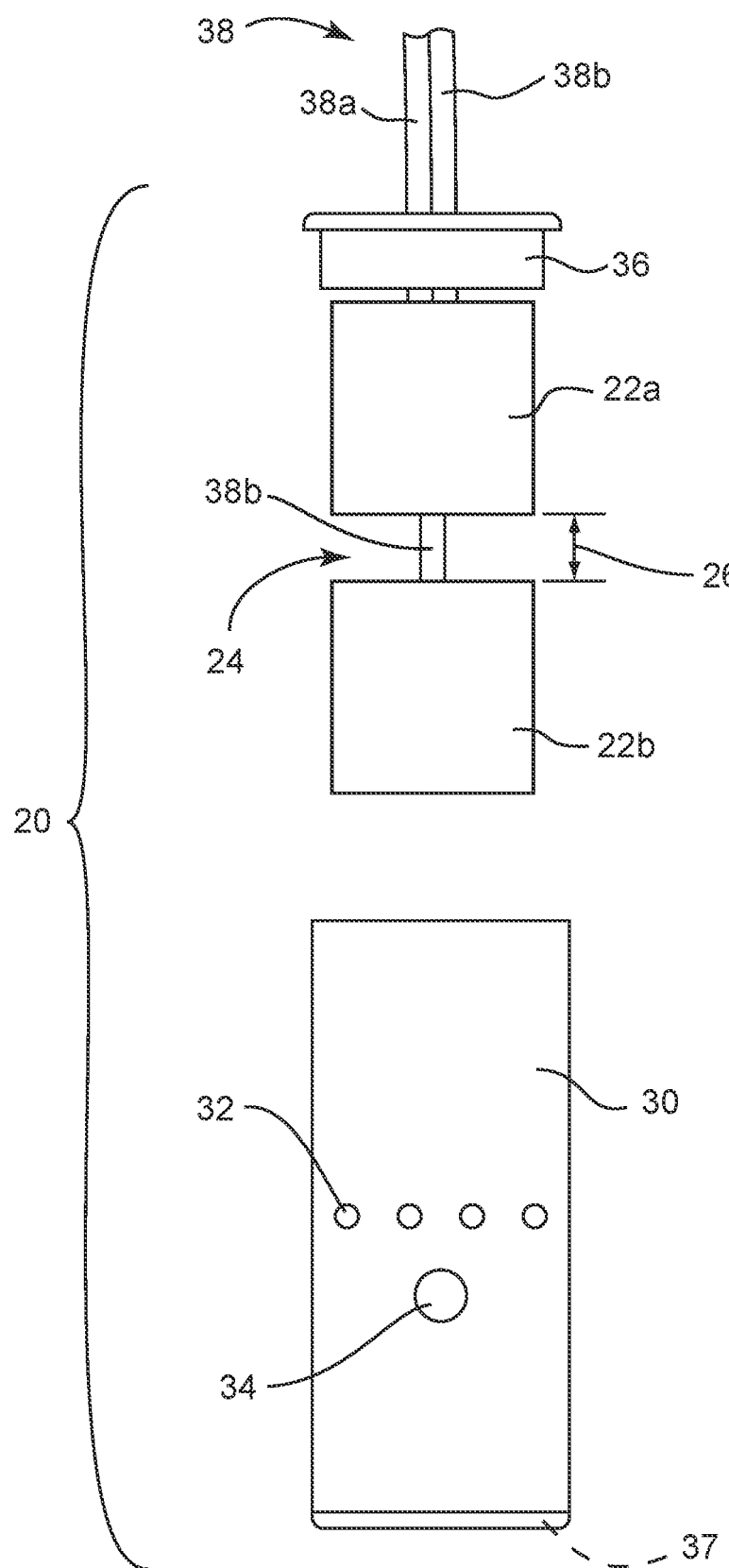
FIG. 2A is a side exploded view of an electrode capsule of a water management system according to an embodiment.
Figure 2B:
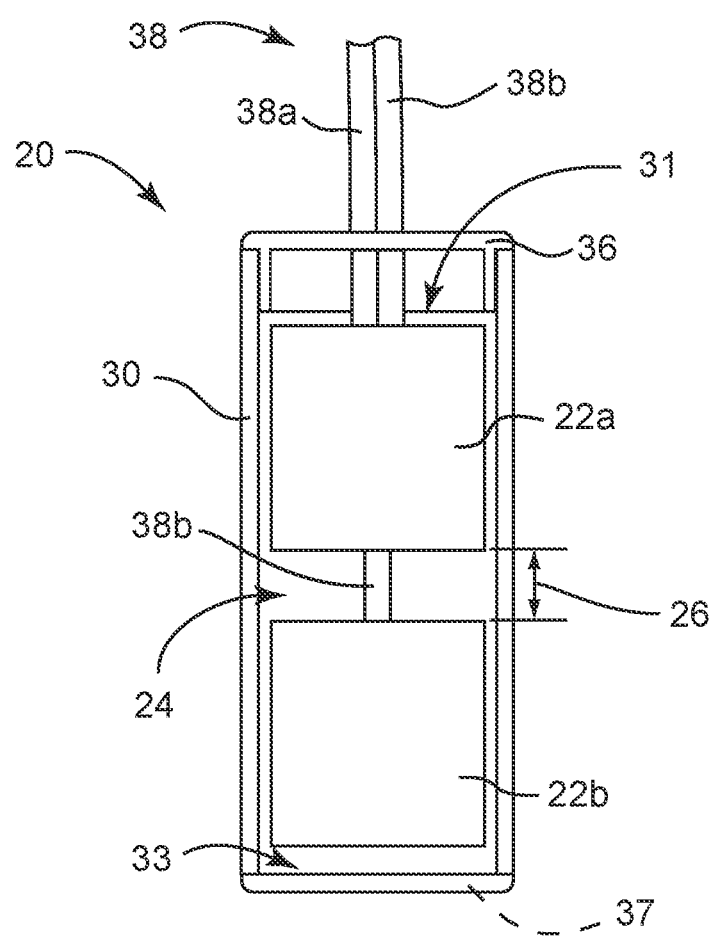
FIG. 2B is a side section view of an electrode capsule of a water management system according to an embodiment.
Figure 3A:
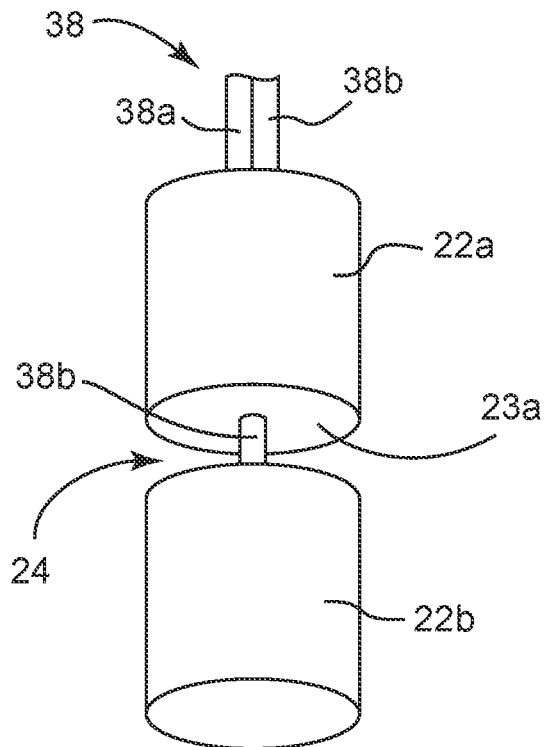
FIG. 3A is a bottom perspective for of first and second electrodes of a water management system according to an embodiment.
Figure 3B:
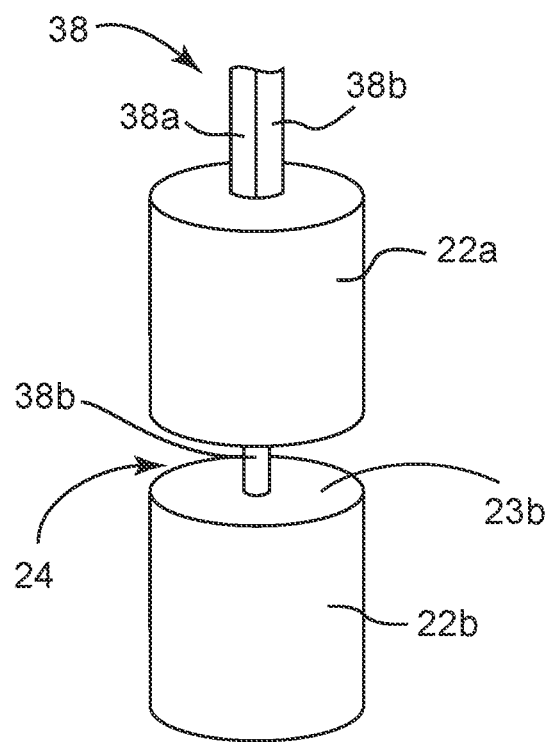
FIG. 3B is a top perspective for of first and second electrodes of a water management system according to an embodiment.

The present invention relates to a water pH control device that controls the pH levels in water for various uses. The device generally operates to separate ions without using a membrane or diaphragm and does not require a tank or specific sectioned tank for operation.

FIGS. 1-3B various components of an embodiment of a water management system 10. In this embodiment, the system 10 comprises a container 12 having a reactant liquid 14 within the container 12, an electrode capsule 20 within the container 12 and submerged in the reactant liquid, the electrode capsule 20 receiving power through electrical connection 38. The container comprises a cap 40 having an electrical aperture 42 and a nozzle 44 that can be coupled to a conduit 60. The electrical aperture 42 allows for electrical connection 38 to extend into the container 12 and couple to the electrode capsule 20. The nozzle 44 allows for generated reactant gas to travel from the container 12 to water 50.

The electrode capsule 20 comprises a housing 30 that comprises a housing body 31 having an inner volume 33. The housing body 31 comprises a plurality of holes 32 and 34 formed through sides of the housing body 31 and into the inner volume 33. The housing body 31 may have a solid bottom portion 37, or in some embodiments, bottom portion 37 may be a bottom cap that is releasably coupled to the housing body 31. The housing 30 further comprises a top cap 36 that is releasably coupled to the housing body 31. The top cap 36 comprises an aperture extending through it to allow electric wires to extend through the aperture.

The inner volume 33 is sized and shaped to receive and retain first electrode 22a and second electrode 22b within the housing 30. In embodiments, first electrode 22a and second electrode 22b have a space 24 between them such that first flat face 23a of first electrode 22a is facing and spaced apart from second flat face 23b of second electrode 22b. The flat faces 23a and 23b are spaced apart and facing each other provide an increased and more efficient generation of reactant gas than other systems that exist, including systems that utilize electrode rods, as will be discussed later. The space 24 between the electrodes 22a and 22b may have a dimension 26. The dimension 26 of the space 24 may be adjusted to certain lengths to correspond to the needs of the water 50 that the system 10 is being used to treat. Electrical connection 38 may include a first wire 38a and a second wire 38b. In embodiments, first wire 38a is coupled to first electrode 22a and second wire 38b is coupled to second electrode 22b. in embodiments, an aperture may be formed through first electrode 22a and a recess formed in second electrode 22b. In this embodiment, first wire 38a and second wire 38b extend into the aperture, with first wire 38a being coupled to the first electrode 22a within the aperture and the second wire 38b extending through the aperture, traversing the space 24, and extending into the recess formed in second electrode 22b and coupled to second electrode within the recess. Electrodes 22a and 22b can include many different types of conductive materials. In some embodiments, electrodes 22a and 22b include graphite with another conductive material, such as, but not limited to, silver. In embodiments, the electrode capsule 20 is cylindrical in shape, wherein the housing 30 and the electrodes 22a and 22b are each cylindrical in shape.

The electrode capsule 20 may be placed within the container 12 and submerged in the reactant liquid 14. Holes 32 and 34 in the housing body 31 allow for reactant liquid 14 to enter and fill voids/open spaces within the inner volume 33 of the housing 30 to surround the electrodes 22a and 22b. The electrodes 22a and 22b may be in communication with the reactant liquid 14 within the housing 30 in response to establishing an electric field therethrough by providing power to the electrodes through electrical connection 38. The electric field is established in response to establishing a potential difference between electrodes 22a and 22b.

The reactant liquid 14 is used to generate a reactant gas 16 in response to the electric field being established through the reactant liquid 14 within the housing 30. In particular, the reactant liquid 14 is used to generate the reactant gas 16 in response to the potential difference being established between electrodes 22a and 22b. It should be noted that the reactant gas 16 includes reactant ions, which are provided in response to the electric field being established through the reactant liquid 14 within the housing 30, and the reactant gas 16 may be a mist including gas and liquid. In particular, the reactant gas 16 includes reactant ions which are provided in response to the potential difference being established between electrodes 22a and 22b. In some embodiments, the reactant ion has a positive charge and, in other embodiments, the reactive ion has a negative charge. The reactant ion adjusts the pH of the reactant liquid 14, wherein the pH is a measure of the acidity or basicity of an aqueous solution. The reactant ion ionizes matter included with the liquid 14. The matter can be of many different types, such as algae and bacteria.

The reactant liquid 14 can be of many different types. In some embodiments, the reactant liquid includes an acid. The acid of the reactant liquid 14 can be of many different types, such as organic and inorganic acids. One type of inorganic acid that can be used is hydrochloric acid (muriatic acid). The hydrochloric acid is typically an aqueous solution. The concentration of the hydrochloric acid of the aqueous solution can be in many different ranges. In some embodiments, the concentration of the hydrochloric acid is six percent (6%) to thirty six percent (36%). In some embodiments, the concentration of the hydrochloric acid is five percent (5%) to forty percent (40%). In some embodiments, the concentration of the hydrochloric acid is less than fifty percent (50%). In one particular, embodiment, the concentration of the hydrochloric acid is twenty-seven percent (28%) to thirty-three (31%).

In this embodiment, system 10 includes a reactant gas 16 generated from the electrode capsule 20. The reactant gas 16, generated as described above, exits the housing 30 through one or more of the holes 32, 34. The reactant gas 16 then rises through the reactant liquid 14 to a top portion of the container 12. As mentioned above, the reactant gas 16 includes reactant ions provided by the reactant liquid 14, wherein the reactant ions are provided in response to the electric field being established between the electrodes 22a and 22b. It should be noted that a conduit 60 allows a fluid to flow therethrough, such as a flow of the reactant gas 16 through the nozzle 44 and then through the conduit 60. The conduit 60 can be of many different types, such as a pipe, a hose, combinations thereof or the like. The conduit 60 may be utilized to flow the reactant gas to the water 50 to be treated.

Figure 4:
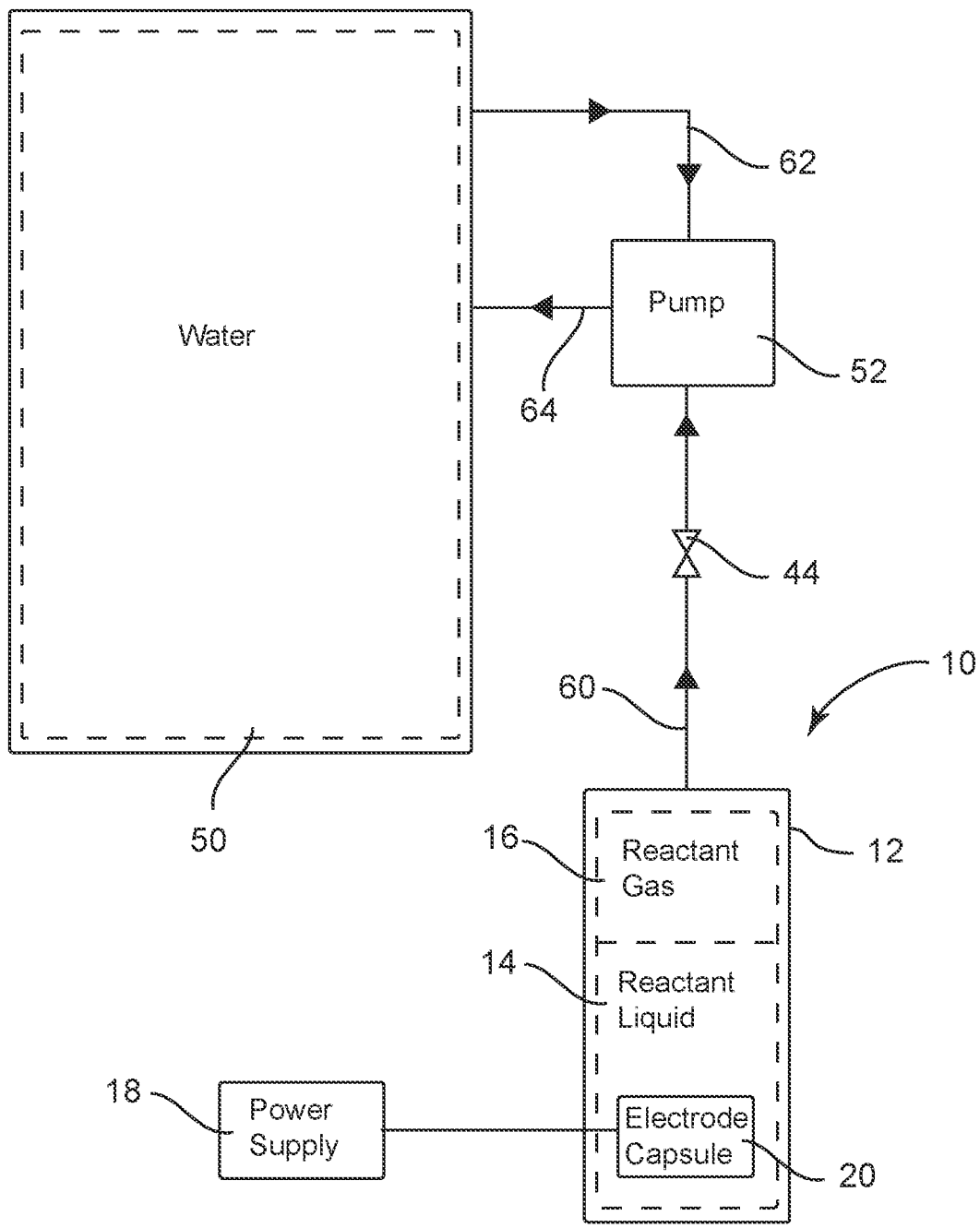
FIG. 4 is a diagrammatic view of a water management system operating to treat an amount of water according to an embodiment.

Referring additionally to FIG. 4, depicted is a diagram of operation of a water management system 10. In this embodiment, a power supply 18 may be coupled with system 10 such as through electrical connection 38 to the electrode capsule 20. Power supply 18 can be of many different types. In some embodiments, power supply 18 is an AC power supply and, in other embodiments, power supply 18 is a DC power supply. An AC power supply provides a power signal with an amplitude that varies with time in a periodic manner. A DC power supply provides a power signal with an amplitude that is substantially constant with time. In some embodiments, the DC power supply provides a power signal with an amplitude which does not vary with time in a periodic manner. In this way, the DC power supply provides a non-periodic power signal. A DC power supply is useful because it is less expensive and less complicated than an AC power supply.

As discussed in more detail above, electrode capsule 20 includes electrodes 22a and 22b in communication with reactant liquid 14 within the housing 30 in order to generate a reactant gas 16 and provides the reactant gas 16 through conduit 60 in response to the power supply 18 supplying power to the electrodes 22a and 22b. Hence, reactant gas 16 flows between container 12 and pump 52 through conduit 60. A valve 40 may be coupled to the conduit 60 between the system 10 and the pump 52. The valve 40 may operate as a filter capacitor or a pH compressor and selected to allow flow of reactant gas 16 through the conduit and to the pump 52 at a rate comparable to the operation of the pump 52 and the gallons per minute ("gpm") being pumped through the pump. In at least this way, the valve operated to control the amount of reactant ions per minute to correspond to the gpm of the pump 52, for example and without limitation, the amount of reactant ions per minute can be controlled by the pH compressor to work with pumps that operate in a range of 5 gpm to 1000 gpm.

In this embodiment, pump 52 receives an input portion of water from water 50 (which may be a water tank, a pool or the like) through a conduit 62 and provides a gasified and strained output water from the pump 52 through conduit 64. The output water from the pump 52 is gasified in response to reactant gas 16 being combined with the input portion of water. Further, the output water is strained in response to flowing through pump 52. While not show, it is understood that the input portion of water may be filtered prior to entering the pump 52.

Figure 5:
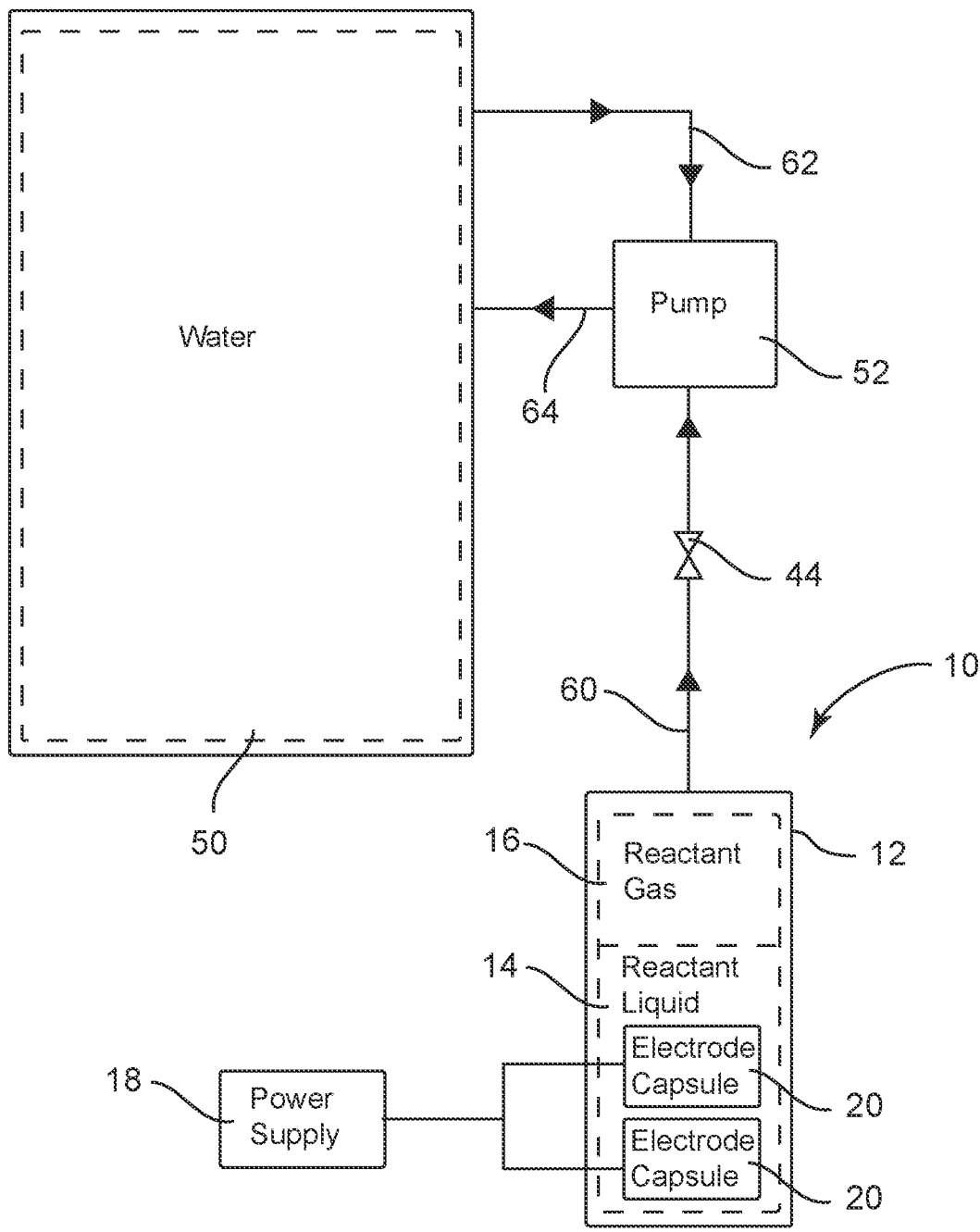
FIG. 5 is a diagrammatic view of a water management system with more than one electrode capsule operating to treat an amount of water according to an embodiment.

Referring additionally to FIG. 5, it can be seen that more than one electrode capsule can operate in the system 10 at the same time and can be located within the same container 12. The operation of the electrode capsules 20 are the same as that described above. It will be understood that as the water 50 to be treated increases in size, there is a need for the system 10 to adjust. In typical chemical treatment of water 50, the amount of chemicals exponentially with an increase in the amount of water and the amount of surface area of the water. Other systems that introduce reactant gas is not scalable within a single container and requires more electrodes to treat the increased amount of water to keep up with the exponential nature of treating the water. Embodiments of the system 10 operate to flatten the exponential curve of treating the water 50 by utilizing more than one electrode capsule 20, which can operate within the same container 12. The addition of electrode capsules 20 within the system 10 increases the generation of reactant gas 16 in an exponential factor allows the system 10 to more easily scale to meet the demands of increased amounts of water to treat. Additionally, because the system does not suffer from dilution as do chemical treatments based on pump operation, use of the water 50 and so forth, treatment efficiency is improved over chemical treatments. Further, electrode capsules 20 includes electrodes 22a and 2b operating within the housing 30, multiple electrode capsules can operate within the same container 12 without interfering with each other.

The reactant gas 16 is chosen so that it treats the water 50. The reactant gas 16 can treat the water 50 in many different ways. In some situations, the pH of the water 50 is adjusted in response to the flow of the reactant gas 16. In some situations, the alkalinity of the water 50 is adjusted in response to the flow of the reactant gas 16. In some situations, both the pH and the alkalinity of the water 50 is adjusted in response to flow of the reactant gas 16. In some situations, the amount of bacteria of the water 50 is reduced in response to the flow of the reactant gas 16. In some situations, the amount of algae of the water 50 is reduced in response to the flow of the reactant gas 16. In this way, system 10 operates as a water treatment system.

Embodiments of the present invention operate to control the pH level and alkalinity in water. Embodiments of the present invention triggers the effect of the scale of alkalinity up or down in order to keep it steady with in 30 ppm and 250 ppm, depending on the gpm of the pump, hour of operation per day and the size of the water management system 10, while balancing the pH within a range of 4.0 to 8.0 depending on the intended use of the water. With the pH in this range the ions that are introduced into the water attaches to oxygen ion and do not destroy alkalinity, does not produce an odor, and reduces other side effects of water that is treated.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A water treatment system, comprising:
a container having an opening, the container comprising a reactant liquid within the container;
an electrode capsule removably retained within the container and submerged in the reactant liquid, the electrode capsule comprising:
a housing having a housing body, an inner volume within the housing body and a plurality of holes in the housing body that extend from an outer surface of the housing body to within the inner volume;
a first electrode and a second electrode having a space between them, wherein a first flat face of the first electrode is facing and spaced apart from a second flat face of the second electrode, wherein the first electrode and the second electrode are retained within the housing, wherein the plurality of holes in the housing allow the reactant liquid to fill voids within the housing and the first and second electrodes operate within the reactant liquid to form a reactant gas that escapes the housing through the plurality of holes and into the container;
a cap releasably coupled to the opening of the container, the cap comprising a nozzle, wherein the cap and the housing are configured to allow an electrical connection to be coupled to the first and second electrodes of the electrode capsule and the nozzle allows flow of the reactant gas out of the container to treat a portion of water from a water source; and
the electrical connection comprising a first wire and a second wire, wherein the electrical connection extends into the container, and through the cap of the electrode capsule, and wherein the first wire coupled to the first electrode and the second wire extends through an aperture in the first electrode and coupled to the second electrode to hold the first and second electrodes in a vertical stacked configuration, the electrical connection supporting the electrode capsule within the reactant liquid within the container.

2. The system of claim 1, wherein the reactant liquid is a muriatic acid.

3. The system of claim 1, wherein the housing comprises a removable cap to expose the inner volume of the housing and to insert the first and second electrodes within the housing.

4. The system of claim 1, wherein the housing is cylindrical in shape.

5. The system of claim 4, wherein the first and second electrodes are cylindrical in shape.

6. The system of claim 1, wherein the nozzle of the container is coupled to a pump through a first conduit coupled between the pump and the nozzle.

7. The system of claim 6, further comprising a valve coupled in-line with the first conduit, wherein the valve is a pH compressor to control an amount of the reactant gas supplied to the pump, the amount corresponding to a gallons per minute operation of the pump.

8. The system of claim 1, further comprising a power supply coupled to the electrode capsule by the electrical connection, wherein the power supply supplies current to the first electrode and the second electrode for generation of the reactant gas.

* * * * *